United States Patent
Zhou et al.

(10) Patent No.: US 12,543,061 B2
(45) Date of Patent: Feb. 3, 2026

(54) BEAM QUALITY ENHANCEMENT TECHNIQUES IN DISCONTINUOUS RECEPTION (DRX) MODE

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 612 days.

(21) Appl. No.: 17/804,275

(22) Filed: May 26, 2022

(65) Prior Publication Data

US 2023/0388836 A1   Nov. 30, 2023

(51) Int. Cl.
| | | |
|---|---|---|
| *H04W 24/10* | (2009.01) | |
| *H04B 17/336* | (2015.01) | |
| *H04L 1/08* | (2006.01) | |
| *H04W 76/28* | (2018.01) | |

(52) U.S. Cl.
CPC .......... *H04W 24/10* (2013.01); *H04B 17/336* (2015.01); *H04L 1/08* (2013.01); *H04W 76/28* (2018.02)

(58) Field of Classification Search
CPC .... H04W 24/10; H04W 76/28; H04B 17/336; H04L 1/08
See application file for complete search history.

(56) References Cited

U.S. PATENT DOCUMENTS

| | | | | |
|---|---|---|---|---|
| 2021/0021321 | A1* | 1/2021 | Liu | ........................ H04B 7/088 |
| 2021/0360573 | A1* | 11/2021 | Manolakos | ........... H04L 5/0053 |
| 2021/0377852 | A1* | 12/2021 | Zhou | ................. H04W 52/0235 |
| 2022/0408275 | A1* | 12/2022 | Awada | .................. H04W 16/26 |
| 2023/0088597 | A1* | 3/2023 | Alfarhan | ............... H04W 76/28 370/252 |
| 2023/0362817 | A1* | 11/2023 | Da Silva | ............... H04W 24/10 |

FOREIGN PATENT DOCUMENTS

| | | |
|---|---|---|
| WO | 2020013872 A1 | 1/2020 |
| WO | 2021163404 A1 | 8/2021 |

OTHER PUBLICATIONS

International Search Report and Written Opinion—PCT/US2023/019635—ISA/EPO—Sep. 18, 2023.
Partial International Search Report—PCT/US2023/019635—ISA/EPO—Jul. 28, 2023.

* cited by examiner

*Primary Examiner* — Marcus Smith
*Assistant Examiner* — Zhaohui Yang
(74) *Attorney, Agent, or Firm* — Patterson & Sheridan, LLP

(57) ABSTRACT

Certain aspects of the present disclosure provide a method for wireless communications by a user equipment (UE). The UE receives a beam monitoring configuration indicating at least one condition to be satisfied for transmission of a beam condition report. The UE monitors at least one beam failure detection (BFD)-reference signal (RS) during an ON duration of a discontinuous reception (DRX) cycle. The UE transmits the beam condition report, at an end of the ON duration of the DRX cycle, when the at least one condition is satisfied during the ON duration of the DRX cycle.

24 Claims, 16 Drawing Sheets

BEAM QUALITY ENHANCEMENT TECHNIQUES IN DISCONTINUOUS RECEPTION (DRX) MODE

BACKGROUND

Field of the Disclosure

Aspects of the present disclosure relate to wireless communications, and more particularly, to techniques for beam management in a discontinuous reception (DRX) mode.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE), comprising: receiving a beam monitoring configuration indicating at least one condition to be satisfied for transmission of a beam condition report; monitoring at least one beam failure detection (BFD)-reference signal (RS) during an ON duration of a discontinuous reception (DRX) cycle; and transmitting the beam condition report at an end of the ON duration of the DRX cycle, when the at least one condition is satisfied during the ON duration of the DRX cycle.

Another aspect provides a method for wireless communications by a network entity, comprising: configuring a UE with a beam monitoring configuration indicating at least one condition to be satisfied for transmission of a beam condition report during monitoring of a BFD-RS during an ON duration of a DRX cycle; and receiving the beam condition report at an end of the ON duration of DRX cycle, when the at least one condition is satisfied during the ON duration of the DRX cycle.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
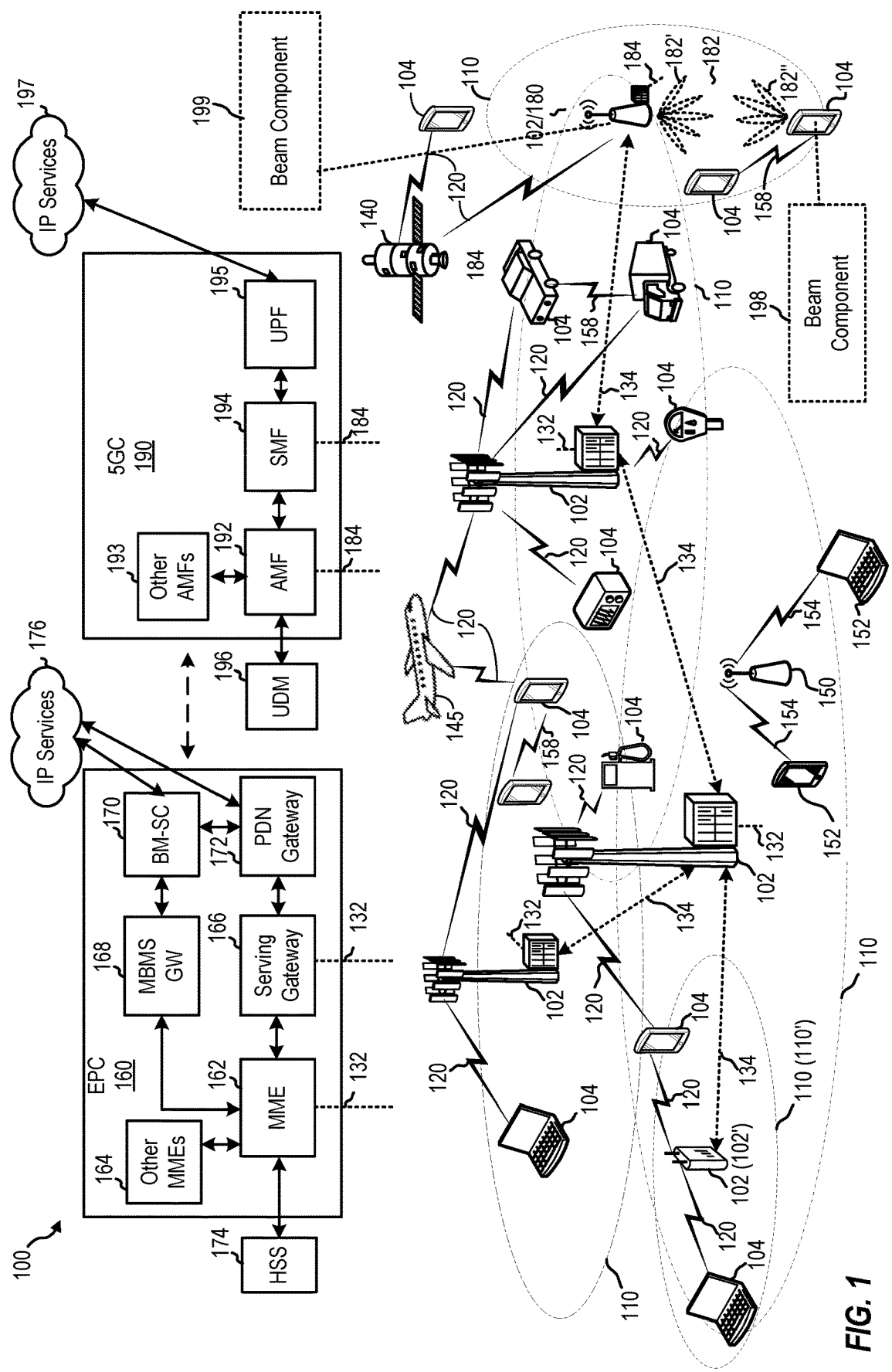
FIG. 1 depicts an example wireless communications network.

Aspects of the present disclosure provide apparatuses, methods, processing systems, and computer-readable mediums for beam management in a discontinuous reception (DRX) mode.

Advanced wireless systems (e.g., 5G new radio (NR)) utilize higher frequencies (e.g., mmWave) with numerous antennas to perform beamforming. Beamforming refers to signal processing techniques that allows a device (e.g., a network entity) to transmit using directional beams that target an intended recipient (e.g., a user equipment (UE)). The beamforming may help make efficient use of frequency resources by reducing interference by controlling transmit directions.

Unfortunately, one potential hazard associated with the beamforming is blockage. The blockage refers to a scenario where a device (e.g., a blocking entity) is present in a beam path, which can suddenly interrupt communications and result in a beam failure. To detect the beam failure, the UE typically measures beam failure detection (BFD) reference signals (BFD-RSs) and determines whether a beam failure trigger condition is satisfied (e.g., based on a defined criteria). If the beam failure is detected, a beam failure recovery (BFR) process may be performed, with the UE sending a beam failure recovery request (BFRQ) to the network entity.

There are various potential issues with existing BFD procedure. One potential issue is that the existing BFD procedure may not work in a DRX mode. This is because the BFD procedure requires the UE to constantly monitor a physical (PHY) layer to calculate a beam quality and determine the beam failure. However, in the DRX mode, the UE is able to monitor the PHY layer only during an ON duration of a DRX cycle, since the UE goes to sleep during an OFF duration of the DRX cycle. As a result, since the UE does not monitor the PHY layer during the OFF duration of the DRX cycle, the UE is not able to calculate the beam quality during the OFF duration of the DRX cycle.

For various applications, the UE may have to maintain a good beam quality throughout the DRX cycle, to ensure the UE can transmit data to the network entity promptly when needed. This may aid the UE to meet quality of service (QoS) requirements associated with the applications. However, in some cases, when a beam may be of a low quality, and the UE unable to declare the beam failure and initiate the BFR during the ON duration of the DRX cycle, there may be a sudden interruption of a communication link between the UE and the network entity at a later time, and the UE may not be able to transmit the data during this interruption period.

Techniques proposed herein may help manage a beam quality for data traffic throughout a DRX cycle. For example, when a UE determines that a beam has some issue (e.g., a channel strength drop) during on ON duration of the DRX cycle but is unable to confirm beam failure at the end of the ON duration of the DRX cycle, the UE generates and transmits a beam condition report associated with the current beam at the end of the ON duration of the DRX cycle to a network entity. The beam condition report may indicate a potential beam failure and/or a request to switch beam. The network entity may switch the beam based on the beam condition report, to ensure there is no interruption of a communication link between the UE and the network entity throughout the DRX cycle.

The techniques proposed herein may help enable maintenance of the beam quality throughout the DRX cycle, which may result in a reduced latency (e.g., as there is no data transmission interruption) and improved quality of service (QoS).

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
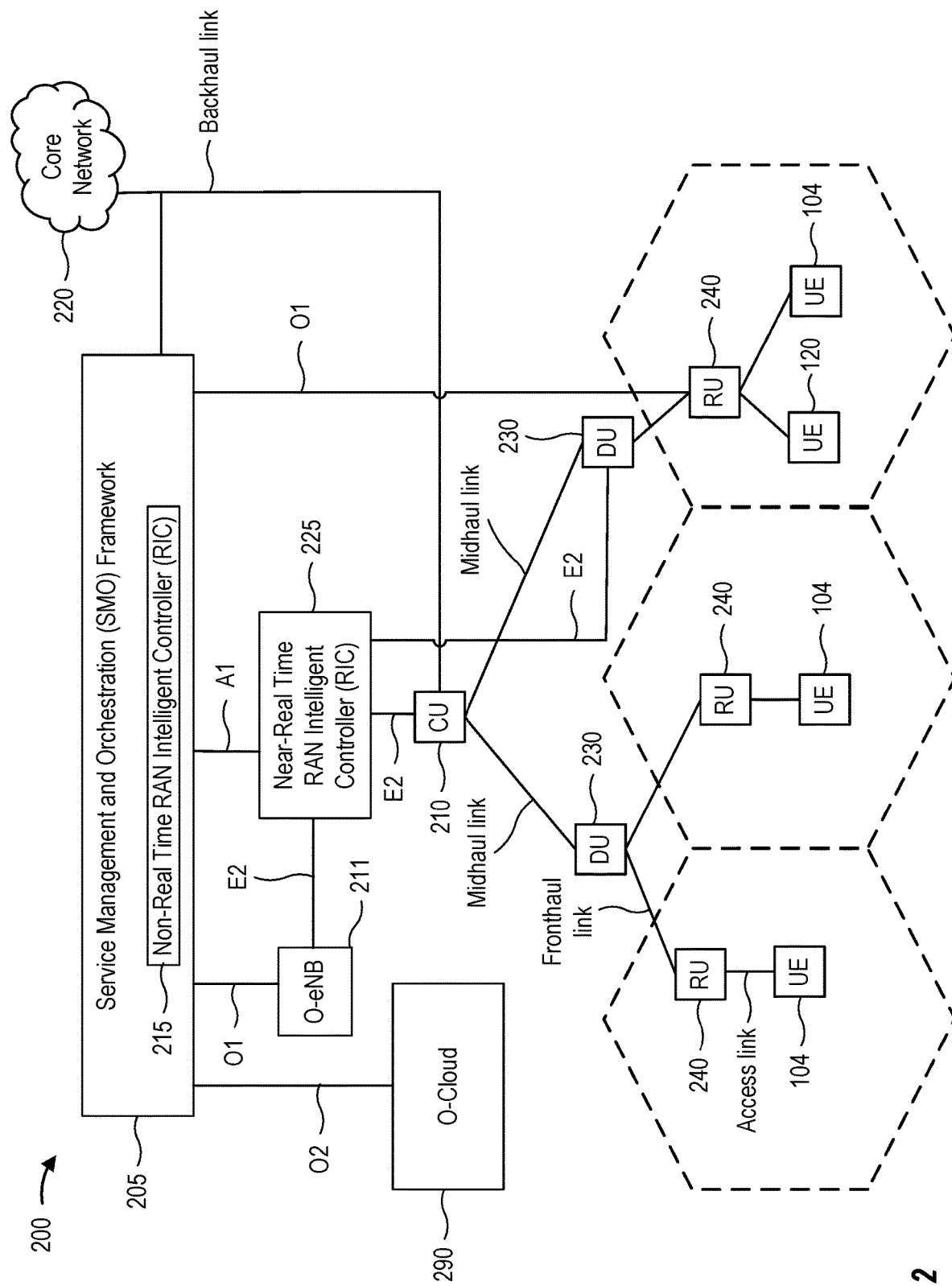
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (DUs), one or more radio units (RUs), a Near-Real Time (Near-RT) RAN Intelligent Controller (MC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A BS configured to communicate using mmWave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 13:
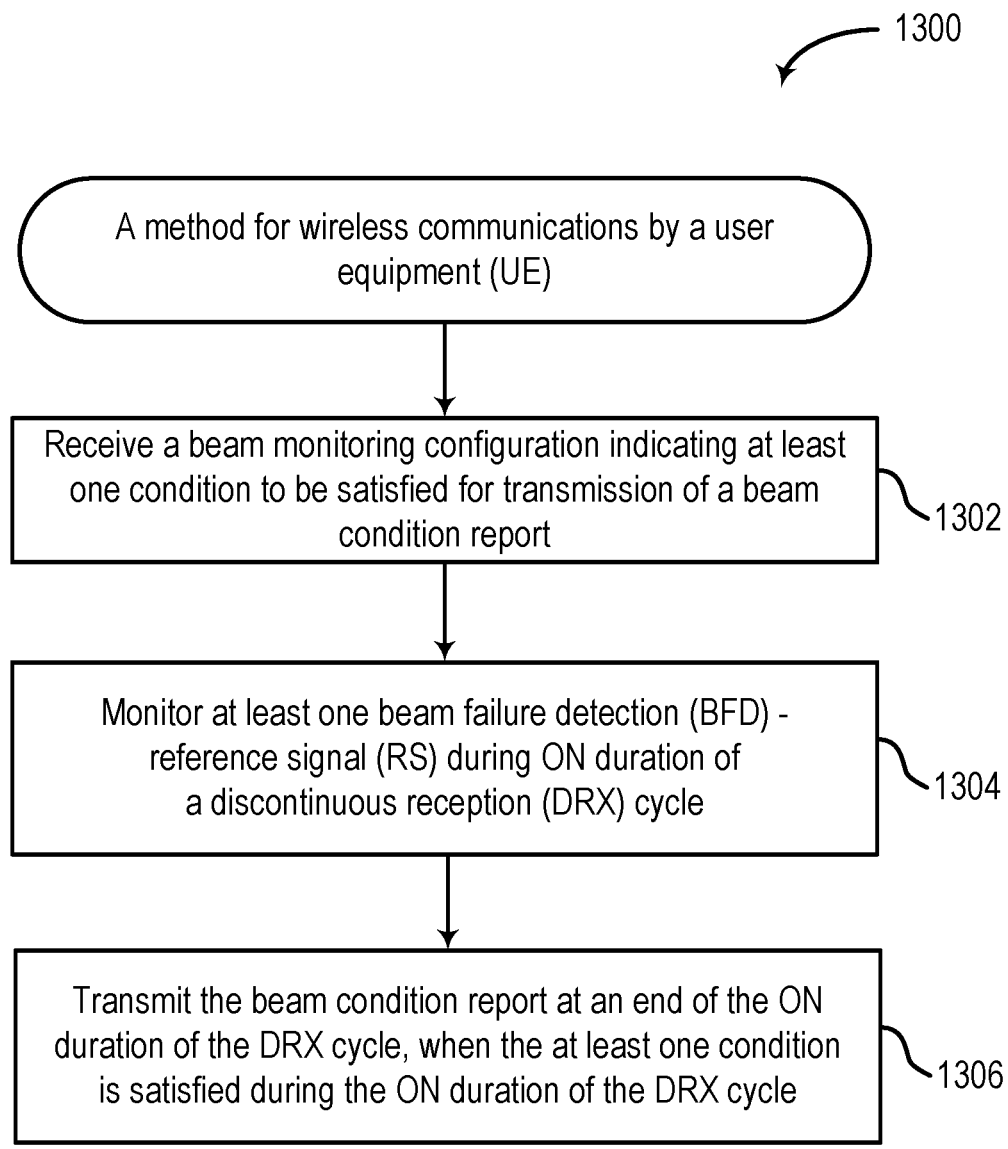
FIG. 13 depicts a method for wireless communications by a UE.

Wireless communication network 100 further includes beam component 198, which may be configured to perform operations 1300 of FIG. 13. Wireless communication network 100 further includes beam component 199, which may be configured to perform operations 1400 of FIG. 14.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an AI interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT MC 225 and may be received at the SMO Framework 205 or the Non-RT MC 215 from non-network data sources or from network functions. In some examples, the Non-RT MC 215 or the Near-RT MC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
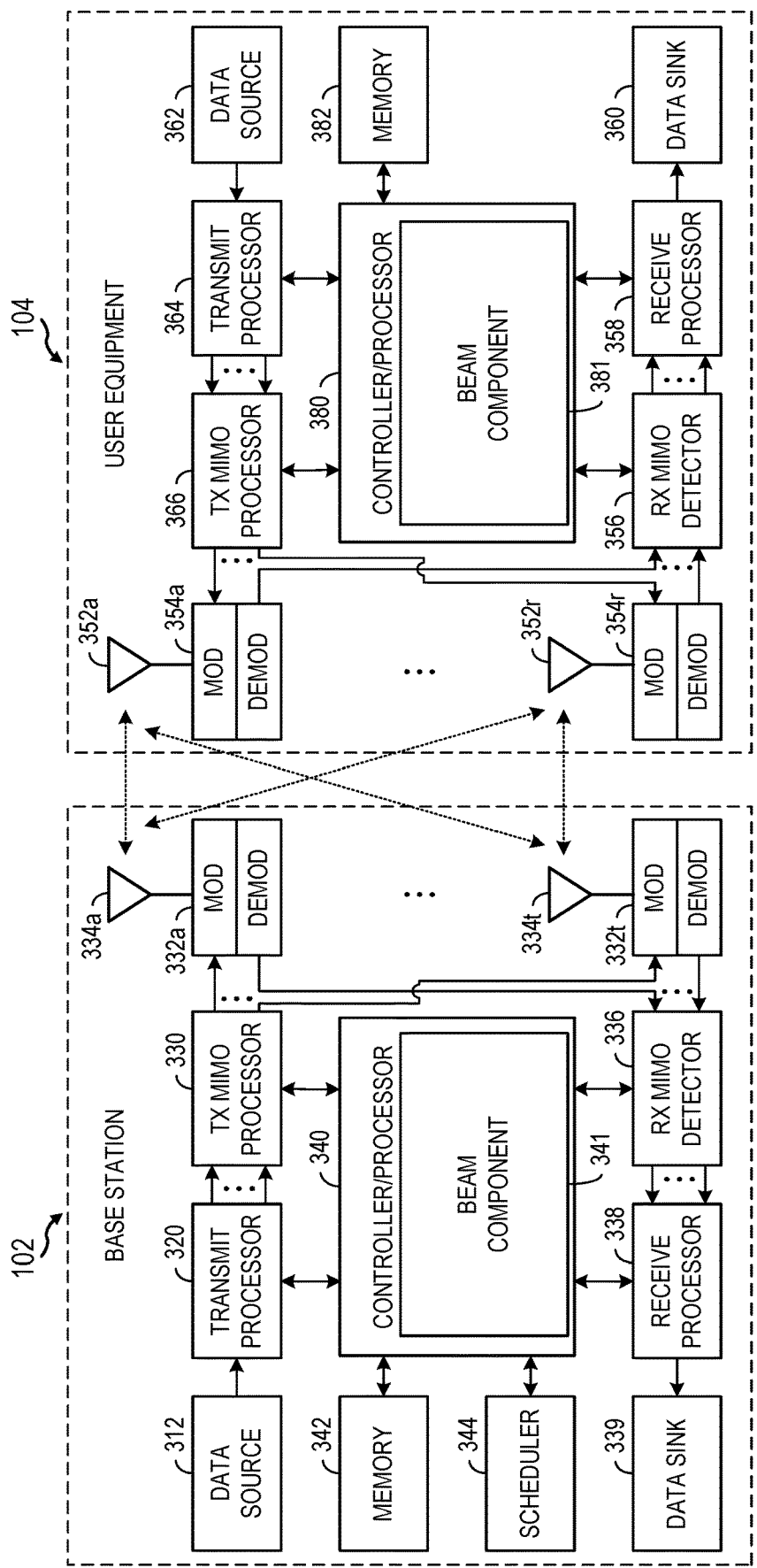
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes beam component 341, which may be representative of beam component 199 of FIG. 1. Notably, while depicted as an aspect of controller/processor 340, beam component 341 may be implemented additionally or alternatively in various other aspects of BS 102 in other implementations.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes beam component 381, which may be representative of beam component 198 of FIG. 1. Notably, while depicted as an aspect of controller/processor 380, beam component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting"

may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
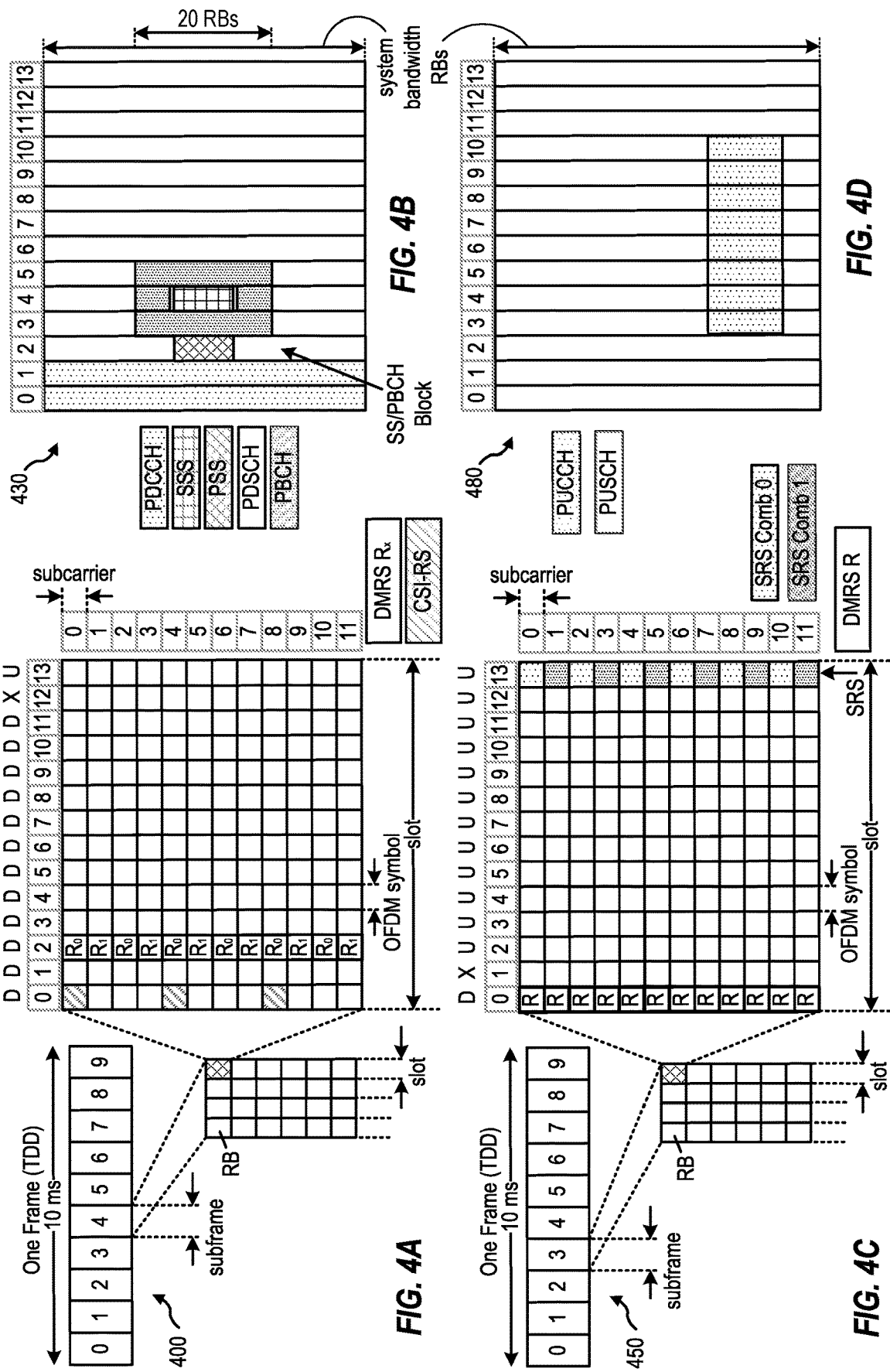
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2\mu \times 15$ kHz, where $\mu$, is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu s$.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Discontinuous Reception (DRX) Cycle

Connected mode discontinuous reception (CDRX) improves user equipment (UE) battery power consumption by allowing the UE to periodically enter sleep state (e.g., OFF duration) during which physical downlink control channel (PDCCH) need not be monitored. In order to monitor the PDCCH for possible downlink/uplink data, the UE is allowed to wake up periodically and stay awake (e.g., ON duration) for a certain amount of time before going to sleep again.

A network entity configures the UE with a set of CDRX parameters. The CDRX parameters may be selected based on an application type such that power and resource savings are maximized. When the CDRX is enabled, the UE power consumption is reduced.

Figure 5:
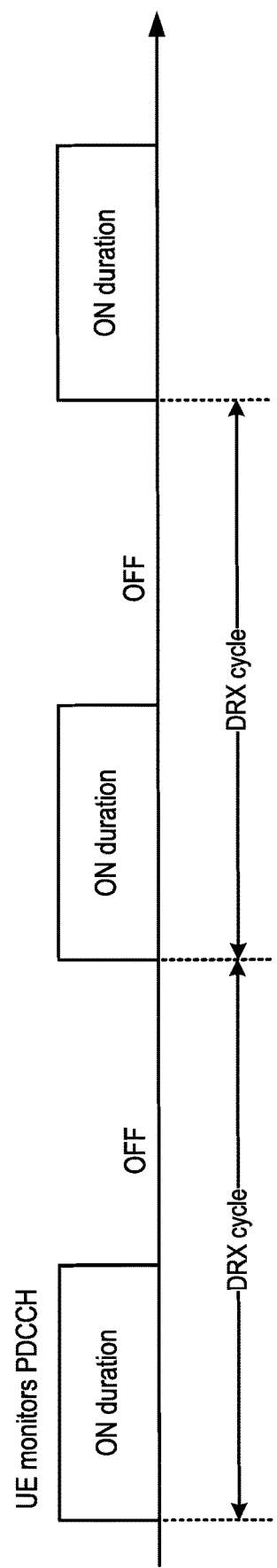
FIG. 5 illustrates example timeline for discontinuous reception (DRX) cycles.
Figure 6:
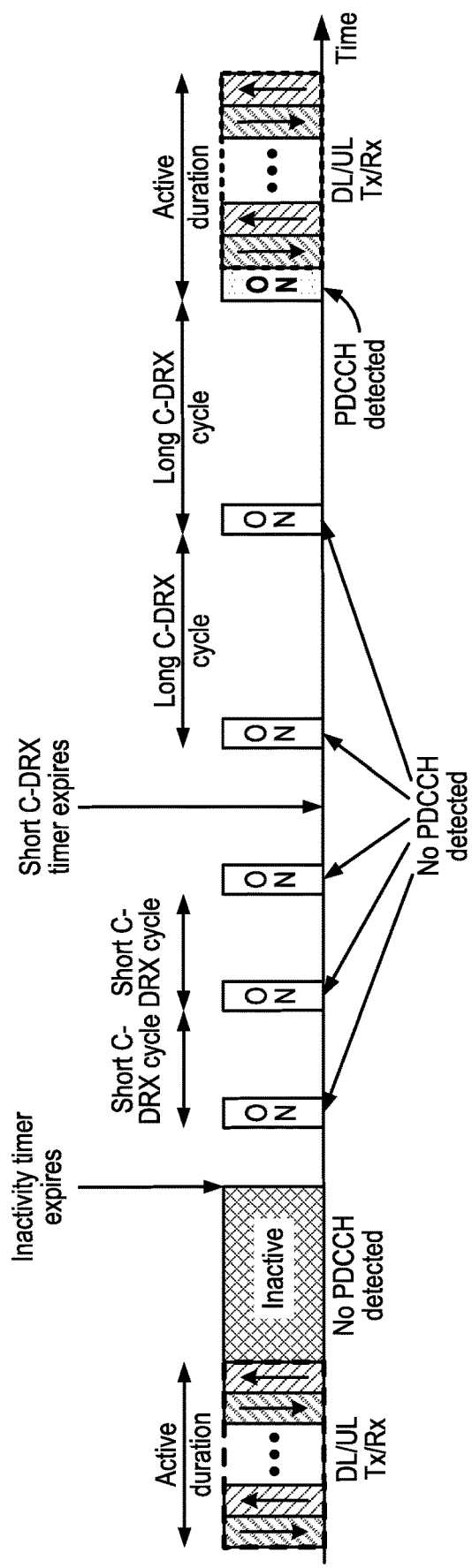
FIG. 6 illustrates example timeline for a connected mode DRX (C-DRX) operation.

As illustrated in FIG. 5 and FIG. 6, during periods of traffic inactivity, a UE switches to a CDRX operation for power saving. The UE is configured for the CDRX operation according to various configuration parameters, such as an inactivity timer, a short DRX (discontinuous reception) timer, a short DRX cycle, and a long DRX cycle.

The long DRX cycle may be characterized by active state and sleep states. The long DRX cycle may not suitable for certain services, which require periods of data transmission followed by periods of no activity. In such cases, a network entity has the flexibility to configure the long DRX cycle together with an additional DRX cycle, which is shorter compared to the long DRX cycle. This additional DRC cycle is the short DRX cycle.

When the network entity has configured the short DRX cycle, it means both long and short DRX cycles are configured. In some cases, configuring the short DRX cycle is optional and if not configured, the UE follows the long DRX cycle as usual. Whenever the network entity configures the short DRX cycle, the network entity ensures that the long DRX cycle duration is an integer multiple of the short DRX cycle duration. This means, the short DRX cycle duration is shorter than the long DRX cycle duration.

Based on configured CDRX cycles, the UE wakes up occasionally for ON durations and monitors for PDCCH transmissions. Except for the ON durations, the UE may remain in a low power (sleep) state referred to as an OFF duration, for the rest of CDRX cycle. During the OFF duration, the UE is not expected to transmit and receive any signal.

In a CDRX mode, the UE wakes up and transmits and/or receives (TX/RX) data packets following CDRX cycle (during the CDRX ON period). In some cases, if the UE detects a PDCCH scheduling data during the ON duration, the UE remains ON to transmit and receive data. Otherwise, the UE goes back to sleep at the end of the ON duration. This type of the CDRX mode has been used many years and is still default behavior of some new radio (NR) networks and UEs.

In some cases, with periodic CDRX cycles, the UE may wake up frequently even when the UE has no data to transmit and/or to monitor for data (e.g., indicated by a page), which wastes UE power. Enlarging the CDRX cycle may cause UEs to wake up less often, but this may also lead to increased data service latency (e.g., if the UE has data packets to transmit well before the next CDRX ON duration). This is because, there might be an extended delay in receiving data as, the UE may be in sleep state at the time of data arrival. The latency increases with CDRX cycle length, i.e., the longer the CDRX cycle length, the higher the latency is. So, the CDRX parameters are selected such that the packet delay is minimized, and power saving is maximized.

Example Beam Monitoring Procedure

In some systems, narrow-beam transmission and reception is useful for improving a link budget at millimeter-wave (mmW) frequencies but may be susceptible to a beam failure. In mmW, directional beamforming is used between a user equipment (UE) and a network entity (e.g., a base station (BS)), and the UE and network entity communicate via a beam pair link (BPL). This may allow the network entity to send targeted beams to the UE, reduce interference, and make efficient use of a frequency spectrum with improved spectral efficiency.

The beam failure refers to a scenario in which a quality of a beam falls below a threshold, which may lead to a radio link failure (RLF). In response to the RLF, the UE may perform a cell reselection process, where the UE may use neighbor BS information acquired from a decoded neighbor advertisement message, or may schedule scanning/sleep intervals to scan for neighbor BSs for a purpose of a handover to a potential target BS.

Figure 7:
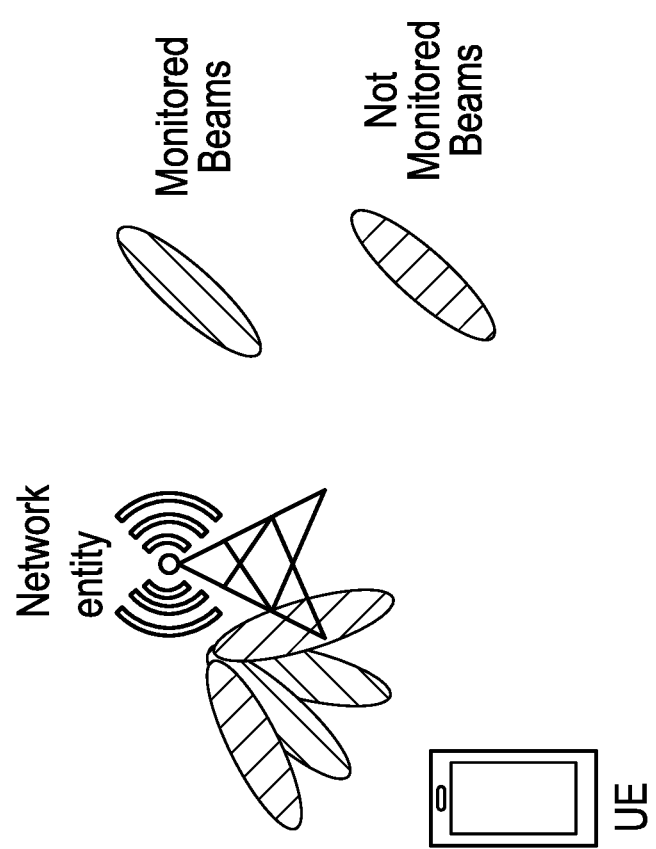
FIG. 7 illustrates example beam monitoring by a UE.

As illustrated in FIG. 7, a UE is configured to monitor a set of beam failure detection (BFD) reference signals (RSs) (e.g., synchronization signal block (SSB)/channel state information (CSI)-RS beams) for measuring beam quality. The UE may monitor a BFD-RS from a primary cell (Pcell), a primary secondary cell (PScell), and/or a secondary cell (Scell) (e.g., coverage area of a BS).

The UE detects a beam failure when a beam failure trigger condition is met (e.g., based on measuring parameters associated with the BFD-RS). In one example, the BFD is triggered when an estimated block error rate (BLER) of the BFD-RS associated with a configured control resource set (CORESET) is above a threshold (e.g., 10%). In another example, the UE detects the beam failure when a reference signal receive power (RSRP) or other signal quality measurement associated with the BFD-RS fails to satisfy (e.g., is below) a threshold. Once the beam failure is detected, the UE initiates a beam failure recovery (BFR).

In some cases, the BFD is a combined layer 1 (L1)/layer 2 (L2) procedure where L1 may provide medium access control (MAC) layer indications of beam failure instances (BFIs). The UE determines a BFI indicator at every occasion of the BFD-RS. The MAC layer counts the indications of the BFIs, and declares the beam failure when a configured maximum number of BFI indications has been reached.

Figure 8:
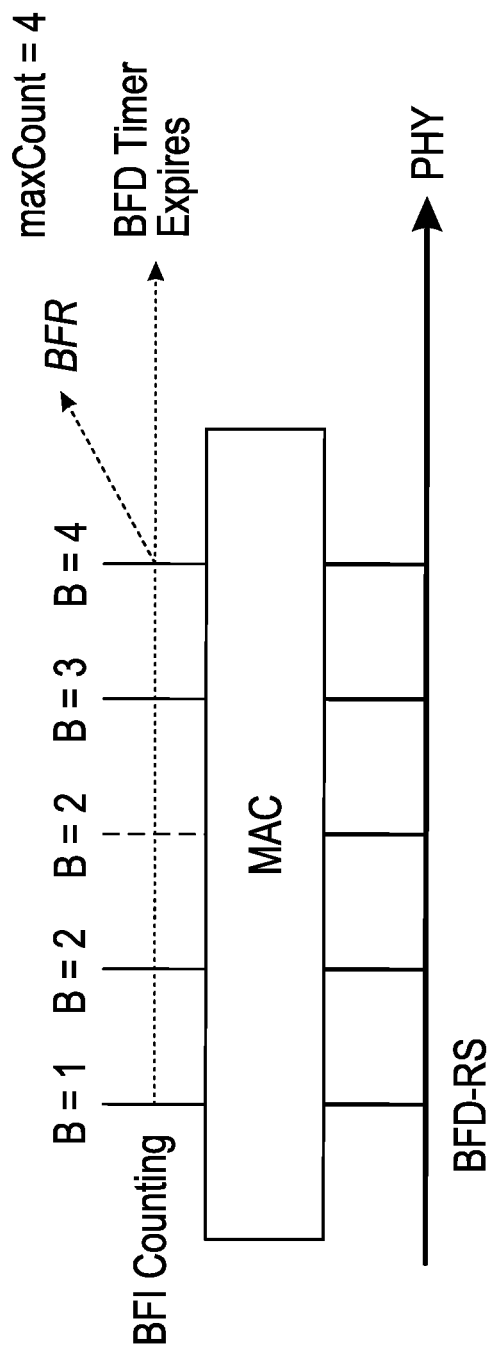
FIG. 8 illustrates example beam failure instance (BFI) indicators at every occasion of a beam failure detection (BFD)-reference signal (RS).

For example, as illustrated in FIG. 8, when a physical (PHY) layer detects that an RSRP of a BFD-RS of a serving beam is below a threshold, the PHY layer triggers a first BFI and sends an indication of the first BFI to the MAC layer. The MAC layer starts a BFD timer as soon as the MAC layer receives the indication of the first BFI. With each new BFI indicator, the MAC layer increases BFI counts by 1. In some cases, when a certain threshold of the BFI is reached before the BFD timer expires (e.g., when a BFI counter is more than or equal to a maximum count of BFIs (e.g., 4)), the MAC layer declares the beam failure and initiates a BFR. In some cases, when the certain threshold of the BFI is not reached before the BFD timer expires (e.g., when the BFI counter is less than maximum count of BFIs), the MAC layer does not declare the beam failure. In such cases, there is a reset of the BFD timer and the BFI counter (e.g., to 0).

Example Beam Monitoring in Discontinuous Reception (DRX) Mode

A conventional beam failure detection (BFD) procedure may not work in a discontinuous reception (DRX) mode. For example, the conventional BFD procedure requires a user equipment (UE) to constantly monitor a physical (PHY) layer to calculate a beam quality and determine a beam failure, based on estimated BFD reference signals (RS) measurements. However, in the DRX mode, the UE is able to monitor the PHY layer only during on ON duration of a DRX cycle, since the UE goes to sleep during an OFF duration of the DRX cycle. As a result, since the UE does not monitor the PHY layer during the OFF duration of the DRX cycle, the UE is not able to calculate the beam quality during the OFF duration of the DRX cycle.

Depending on a quality of service (QoS) requirement of a serving traffic, the UE may have to maintain a good beam quality throughout the DRX cycle, to ensure data can be transmitted to a network entity promptly when needed. For example, in extended reality (XR) applications, the UE executing the XR applications has to transmit pose data (e.g., user eye or hand movements in a video game) to the network entity before a deadline, because otherwise the pose data (sent after the deadline) is discarded and it may negatively impact experience of a user playing the video game on the UE.

Figure 9:
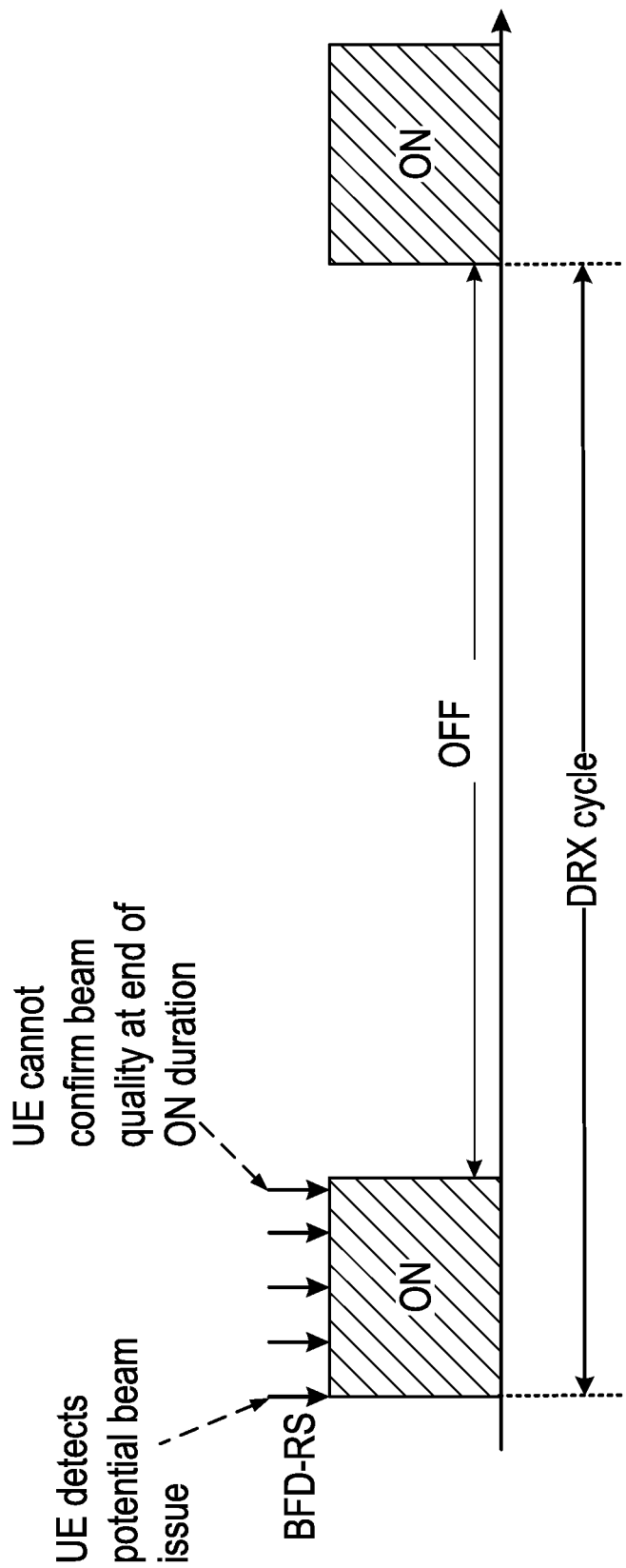
FIG. 9 illustrates example beam monitoring during an ON duration of a DRX cycle.

In some DRX mode cases, as illustrated in FIG. 9, the UE may start to perform a BFD process during an ON duration of a DRX cycle and detect a potential issue with a current BFD-RS beam. However, due to a limited time of the ON duration of the DRX cycle, the UE may not be able to confirm a beam quality of the current BFD-RS beam at an end of the ON duration of the DRX cycle. The UE may pause the BFD process at the end of the ON duration of the DRX cycle, and then again continue the BFD process during a next ON duration of the DRX cycle. However, as noted above, some applications/serving data traffic may require consistent beam quality maintenance. For example, in the XR applications, the UE may need to consistently maintain good beam quality to facilitate prompt transmission of data (e.g., the pose data) whenever there is a pose data update. In such cases, since the current BFD-RS beam may have a low quality (but the UE was unable to declare the beam failure during the ON duration of the DRX cycle and initiate a BFR), there may be a sudden interruption of a communication link between the UE and the network entity at a later time, and the UE may not be able to promply transmit the data (e.g., pose data) during this interruption period. Accordingly, there is a need for enhanced techniques to ensure maintenance of a beam quality for data traffic throughout a DRX cycle.

Aspects Related to Beam Quality Enhancement Techniques in DRX Mode

Aspects of the present disclosure provide apparatuses, methods, processing systems, and computer-readable mediums for beam management in a discontinuous reception (DRX) mode.

For example, when a user equipment (UE) determines that a current beam has some issue (e.g., a channel strength drop) during an ON duration of a DRX cycle but is unable to confirm a beam failure at the end of the ON duration of the DRX cycle, the UE generates and transmits a beam condition report associated with the current beam to a network entity. The beam condition report may indicate a potential beam failure and/or a request to switch beam. The network entity may then switch the beam based on the beam condition report.

The techniques proposed herein ensure maintenance of beam quality for data traffic throughout the DRX cycle. This may result in a reduced latency (e.g., as there is no data transmission interruption), and improved quality of service (QoS) and beam condition. The techniques proposed herein may be understood with reference to the FIGS. 10-14.

Figure 10:
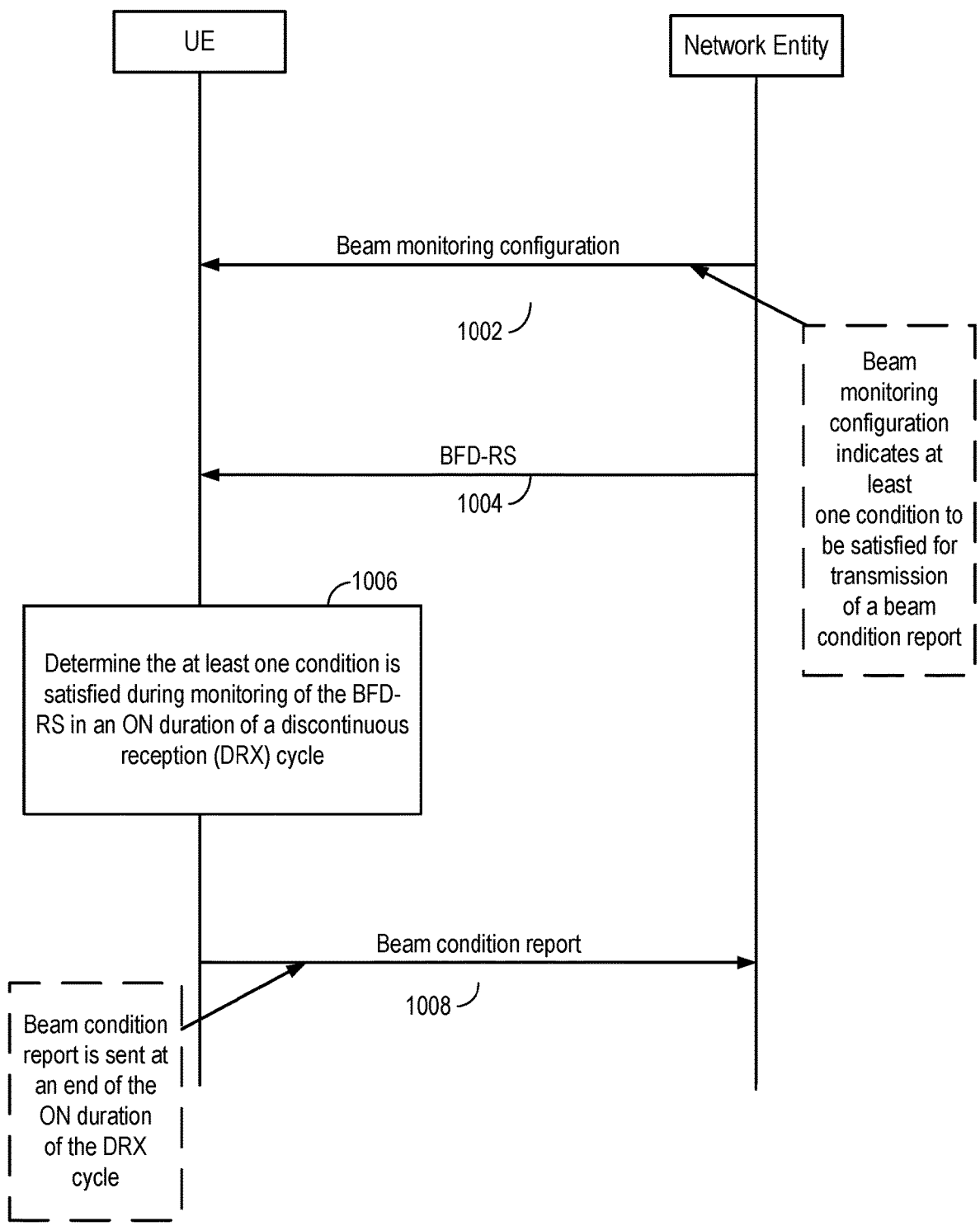
FIG. 10 depicts a call flow diagram illustrating example communication between a UE and a network entity.

As illustrated in FIG. 10, at 1002, a network entity (e.g., such as gNodeB (gNB) or BS 102 in wireless communication network 100 of FIG. 1) transmits a beam monitoring configuration to a UE (e.g., such as UE 104 in wireless communication network 100 of FIG. 1). In one example, the beam monitoring configuration indicates at least one condition to be satisfied for transmission of a beam condition report. In another example, the beam monitoring configuration indicates a beam monitoring set. The beam monitoring set may indicate a set of different beams (e.g., that have to be monitored).

In certain aspects, the network entity may transmit the beam monitoring configuration to the UE using a layer 3 (L3) signaling or a radio resource control (RRC) configuration message.

In certain aspects, the network entity may switch the beam monitoring configuration (e.g., replace the at least one condition with new conditions) using a layer 1 (L1)/layer 2 (L2) signaling such as a medium access control (MAC) control element (CE) or a downlink control information (DCI).

At 1004, the network entity transmits one or more beam failure detection (BFD)-reference signals (RSs). In one example, a BFD-RS is a synchronization signal block (SSB). In another example, a BFD-RS is a channel state information (CSI)-RS.

At 1006, the UE may operate in a DRX mode and monitor the BFD-RS (e.g., during an ON duration of a DRX cycle). The UE determines the at least one condition is satisfied during the monitoring of the BFD-RS in the ON duration of the DRX cycle.

In certain aspects, the at least one condition is satisfied based on an estimated channel strength drop during the ON duration of the DRX cycle. For example, when a value of a signal to interference noise ratio (SINR) of the BFD-RS is dropped by a predetermined value (e.g., X dB) compared to a previous SINR value during the ON duration of the DRX cycle, the UE determines that the at least one condition is satisfied.

In certain aspects, when the UE determines a new beam not included in the beam monitoring set during the ON duration of the DRX cycle (i.e., discovery of a new candidate beam that is not in a configured beam monitoring set), the UE determines that the at least one condition is satisfied.

In certain aspects, when the UE predicts a beam failure during the ON duration of the DRX cycle based on one or more signal measurements associated with the BFD-RS, the at least one condition is satisfied. The one or more signal measurements may include a block error rate (BLER) and/or a reference signal receive power (RSRP) associated with the BFD-RS.

Figure 11:
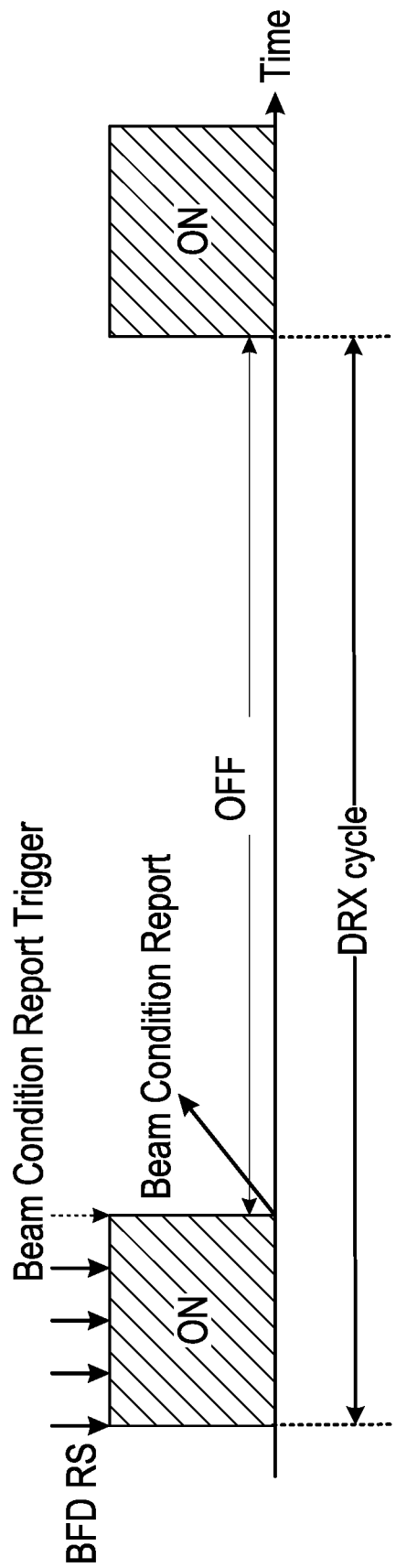
FIG. 11 depicts example transmission of a beam condition report at an end of an ON duration of a DRX cycle.

At 1008, the UE generates and transmits the beam condition report (e.g., at an end of the ON duration of the DRX cycle, as illustrated in FIG. 11) to the network entity, when the at least one condition is satisfied.

In certain aspects, the beam condition report indicates information identifying one or more factors for the transmission of the beam condition report (i.e., reasons for sending the beam condition report). The information indicates a potential beam failure based on the one or more signal measurements associated with the BFD-RS and/or a drop in the channel strength beyond a threshold (e.g., the predetermined value) within a predetermined period of time.

In certain aspects, the beam condition report indicates a status of a BFD. The status of the BFD is based on indications of a beam failure instance (BFI) at each occasion of the BFD-RS during the monitoring of the BFD-RS in the ON duration of the DRX cycle. The status indicates a current number of total BFI counts and/or a BFI record history (e.g., a previous number of total BFI counts during the monitoring of a previous BFD-RS).

In certain aspects, the beam condition report indicates a channel measurement report associated with a channel between the UE and a network entity. The channel measurement report indicates a SINR, a signal to noise ratio (SNR), an RSRP, and/or a pathloss.

In certain aspects, the beam condition report indicates a preferred response from a network entity. The preferred response indicates a first request for beam switch (e.g., to switch from a current beam to another beam), a second request for additional new BFD-RS resources to monitor new beams for a BFD, and/or a third request to change a subset of beams within the beam monitoring set.

In certain aspects, the network entity may configure (e.g., using RRC) the UE with a beam condition report configuration indicating one or more types of the beam condition report (e.g., a first type of the beam condition report conveying a beam failure detection status, a second type of the beam condition report indicating a preferred network response). The beam condition report configuration may depend on how comprehensive the network entity wants the beam condition report to be and/or how much physical uplink shared channel (PUSCH) resource is available. In certain aspects, the network entity may reconfigure (e.g., using the MAC-CE or the DCI) the UE with a new beam condition report configuration indicating one or more new types of the beam condition report (e.g., a third type of the beam condition report conveying a channel measurement report).

In certain aspects, the UE may transmit the beam condition report using different transmitting options and/or techniques. The different techniques are selected based on a size of the beam condition report (e.g., per the beam condition report configuration).

In one example, the UE transmits the beam condition report using an uplink control information (UCI) when the size of the beam condition report is less than a predetermined size (i.e., the beam condition report has a small size). In another example, the UE transmits the beam condition report using a MAC-CE when the size of the beam condition report is more than the predetermined size (i.e., beam condition report has a large size).

Figure 12:
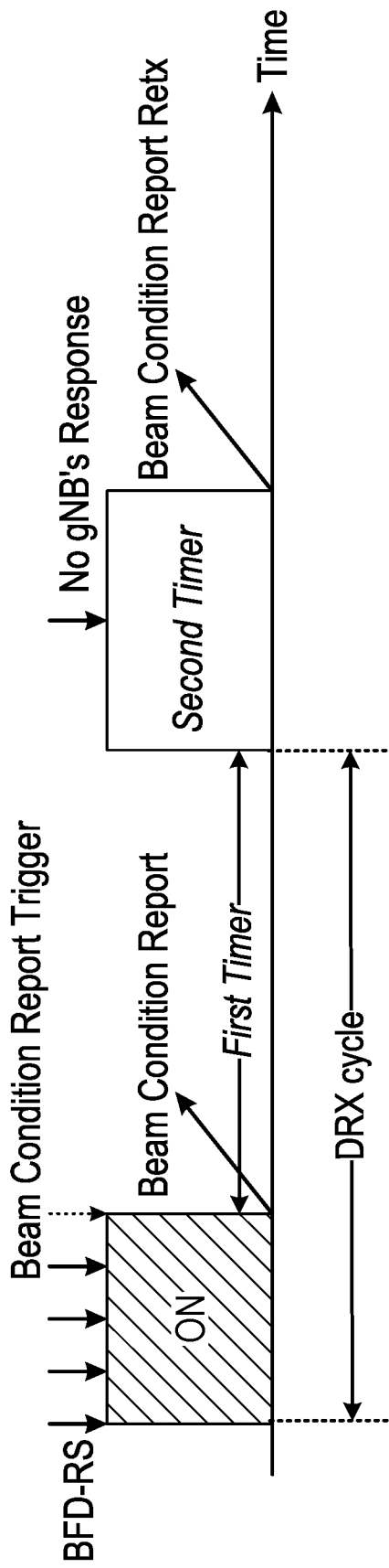
FIG. 12 depicts example monitoring of a response to a beam condition report from a network entity, after a first predetermined period of time, for a second predetermined period of time.

As illustrated in FIG. 12, after transmitting the beam condition report, the UE monitors a response to the beam condition report from the network entity, after a first predetermined period of time (e.g., a first timer duration), for a second predetermined period of time (e.g., a second timer duration). When no response is received during the second predetermined period of time, the UE initiates retransmission of the beam condition report using retransmission resources. The network entity may preconfigure the UE with the retransmission resources.

In one example, the UE is configured to retransmit the beam condition report to a maximum of a predetermined number of times (e.g., N number of times), and each retransmission of the beam condition report is separated by a third predetermined period of time (e.g., after every X milliseconds (ms)).

In another example, the UE is configured to retransmit the beam condition report in a specific pattern, and each retransmission of the beam condition report is separated by a different period of time (e.g., a first retransmission of the beam condition report in X ms, a second retransmission of the beam condition report in X+Y ms, a third retransmission of the beam condition report in X+Y+Z ms, etc.)

In certain aspects, the network entity may configure (e.g., using RRC) the UE with a beam condition report retransmission configuration indicating a retransmission procedure of the beam condition report and/or retransmission parameters (e.g., the retransmission resources). The retransmission procedure of the beam condition report is based on a QoS requirement of a serving traffic, a delay estimate, and/or a pathloss estimate.

Example Operations of a User Equipment (UE)

FIG. 13 illustrates example operations 1300 for wireless communication. The operations 1300 may be performed, for example, by a user equipment (UE) (e.g., such as UE 104 in wireless communication network 100 of FIG. 1). The operations 1300 may be implemented as software components that are executed and run on one or more processors (e.g., controller/processor 380 of FIG. 3). Further, transmission and reception of signals by the UE in the operations 1300 may be enabled, for example, by one or more antennas (e.g., antennas 352 of FIG. 3). In certain aspects, the transmission and/or reception of signals by the UE may be implemented via a bus interface of one or more processors (e.g., the controller/processor 380) obtaining and/or outputting signals.

The operations 1300 begin, at 1302, by receiving a beam monitoring configuration indicating at least one condition to be satisfied for transmission of a beam condition report. For example, the UE may receive the beam monitoring configuration, using antenna(s) and/or receiver/transceiver components of UE 104 shown in FIG. 1 or FIG. 3 and/or of the apparatus shown in FIG. 15.

At 1304, the UE monitors at least one beam failure detection (BFD)-reference signal (RS) during an ON duration of a discontinuous reception (DRX) cycle. For example, the UE may monitor the at least BFD-RS, using a processor of UE 104 shown in FIG. 1 or FIG. 3 and/or of the apparatus shown in FIG. 15.

At 1306, the UE transmits the beam condition report at an end of the ON duration of the DRX cycle, when the at least one condition is satisfied during the ON duration of the DRX cycle. For example, the UE may transmit the beam condition report, using a processor of UE 104 shown in FIG. 1 or FIG. 3 and/or of the apparatus shown in FIG. 15.

Note that FIG. 13 is just one example of a method, and other methods including fewer, additional, or alternative steps are possible consistent with this disclosure.

Example Operations of a Network Entity

Figure 14:
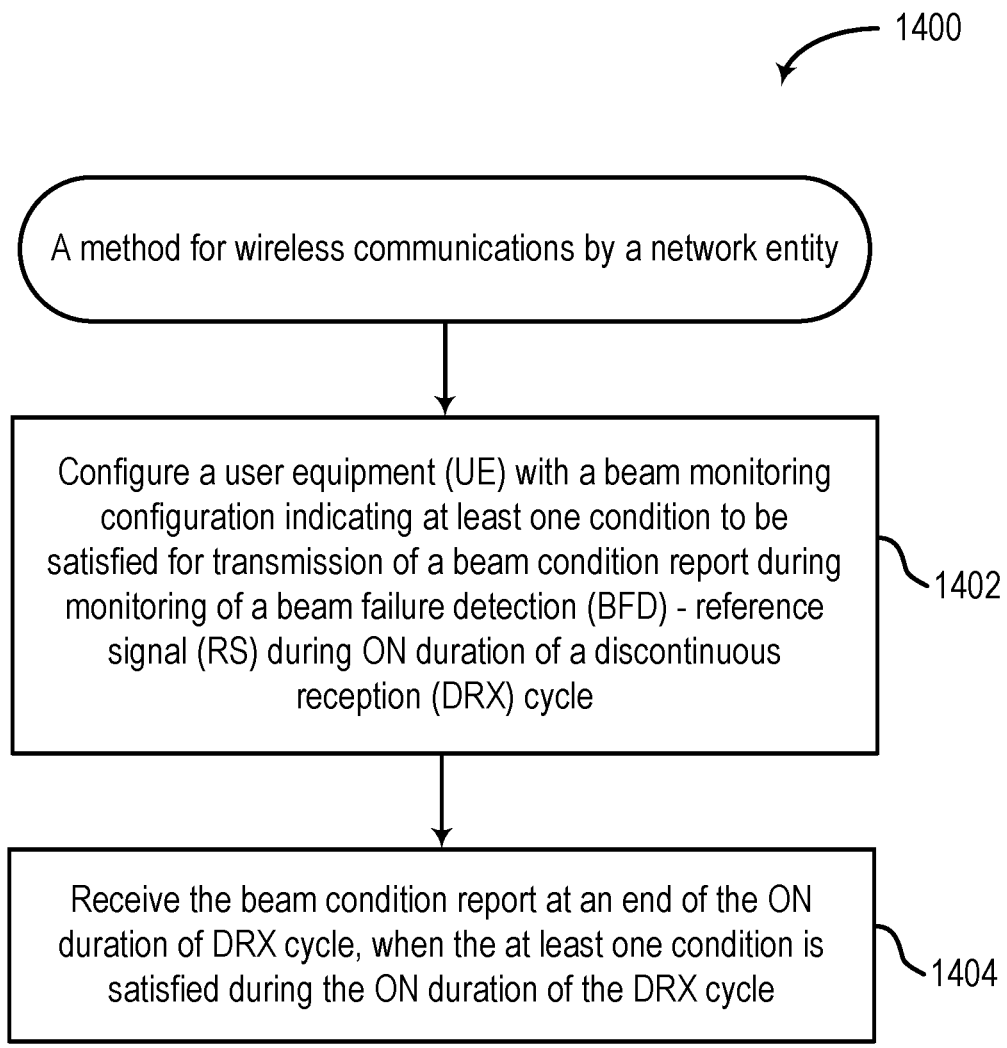
FIG. 14 depicts a method for wireless communications by a network entity.

FIG. 14 illustrates example operations 1400 for wireless communication. The operations 1400 may be performed, for example, by a network entity (e.g., such as BS 102 in wireless communication network 100 of FIG. 1). The operations 1400 may be implemented as software components that are executed and run on one or more processors (e.g., controller/processor 340 of FIG. 3). Further, transmission and reception of signals by the network entity in the operations 1400 may be enabled, for example, by one or more antennas (e.g., antennas 334 of FIG. 3). In certain aspects, the transmission and/or reception of signals by the network entity may be implemented via a bus interface of one or more processors (e.g., the controller/processor 340) obtaining and/or outputting signals.

The operations 1400 begin, at 1402, by configuring a user equipment (UE) with a beam monitoring configuration indicating at least one condition to be satisfied for transmission of a beam condition report during monitoring of a beam failure detection (BFD)-reference signal (RS) during an ON duration of a discontinuous reception (DRX) cycle. For example, the network entity may configure the UE with the beam monitoring configuration, using antenna(s) and/or transmitter/transceiver components of BS 102 shown in FIG. 1 or FIG. 3 and/or of the apparatus shown in FIG. 16.

At 1404, the network entity receives the beam condition report at an end of the ON duration of DRX cycle, when the at least one condition is satisfied during the ON duration of the DRX cycle. For example, the network entity may receive the beam condition report, using antenna(s) and/or receiver/transceiver components of BS 102 shown in FIG. 1 or FIG. 3 and/or of the apparatus shown in FIG. 16.

Note that FIG. 14 is just one example of a method, and other methods including fewer, additional, or alternative steps are possible consistent with this disclosure.

Example Communications Devices

Figure 15:
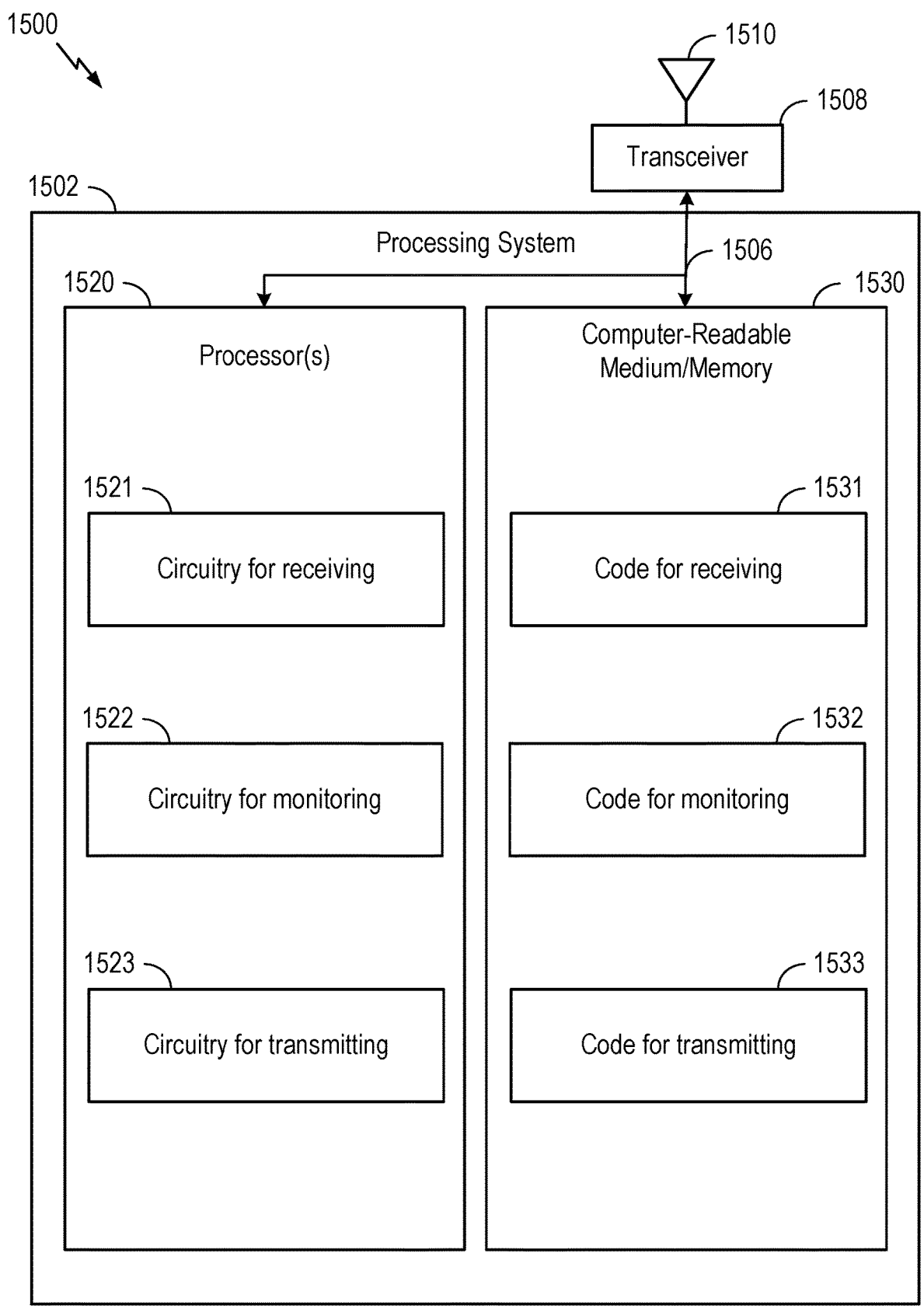
FIG. 15 depicts aspects of an example communications device.

FIG. 15 depicts aspects of an example communications device 1500. In some aspects, communications device 1500 is a UE, such as UE 104 described above with respect to FIGS. 1 and 3.

The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes one or more processors 1520. In various aspects, the one or more processors 1520 may be representative of one or more of receive processor 358, transmit processor 364, TX MIMO processor 366, and/or controller/processor 380, as described with respect to FIG. 3. The one or more processors 1520 are coupled to a computer-readable medium/memory 1530 via a bus 1506. In certain aspects, the computer-readable medium/memory 1530 is configured to store instructions (e.g., computer-executable code) that when executed by the one or more processors 1520, cause the one or more processors 1520 to perform the operations 1300 described with respect to FIG. 13, or any aspect related to it. Note that reference to a processor performing a function of communications device 1500 may include one or more processors performing that function of communications device 1500.

In the depicted example, computer-readable medium/memory 1530 stores code (e.g., executable instructions) for receiving 1531 comprising code for receiving a beam monitoring configuration indicating at least one condition to be satisfied for transmission of a beam condition report, code for monitoring 1532 comprising code for monitoring at least one BFD-RS during ON duration of a DRX cycle, and code for transmitting 1533 comprising code for transmitting the beam condition report at an end of the ON duration of the DRX cycle, when the at least one condition is satisfied during the ON duration of the DRX cycle. Processing of the code 1531-1535 may cause the communications device 1500 to perform the operations 1300 described with respect to FIG. 13, or any aspect related to it.

The one or more processors 1520 include circuitry configured to implement (e.g., execute) the code stored in the computer-readable medium/memory 1530, including circuitry for receiving 1521 comprising circuitry for receiving a beam monitoring configuration indicating at least one condition to be satisfied for transmission of a beam condition report, circuitry for monitoring 1522 comprising circuitry for monitoring at least one BFD-RS during ON duration of a DRX cycle, and circuitry for transmitting 1523 comprising circuitry for transmitting the beam condition report at an end of the ON duration of the DRX cycle, when the at least one condition is satisfied during the ON duration of the DRX cycle. Processing with circuitry 1521-1523 may cause the communications device 1500 to perform the operations 1300 described with respect to FIG. 13, or any aspect related to it.

Various components of the communications device 1500 may provide means for performing the operations 1300 described with respect to FIG. 13, or any aspect related to it. For example, means for transmitting, sending or outputting for transmission may include the transceivers 354 and/or antenna(s) 352 of the UE 104 illustrated in FIG. 3 and/or transceiver 1508 and antenna 1510 of the communications device 1500 in FIG. 15. Means for receiving or obtaining may include the transceivers 354 and/or antenna(s) 352 of the UE 104 illustrated in FIG. 3 and/or transceiver 1508 and antenna 1510 of the communications device 1500 in FIG. 15.

Figure 16:
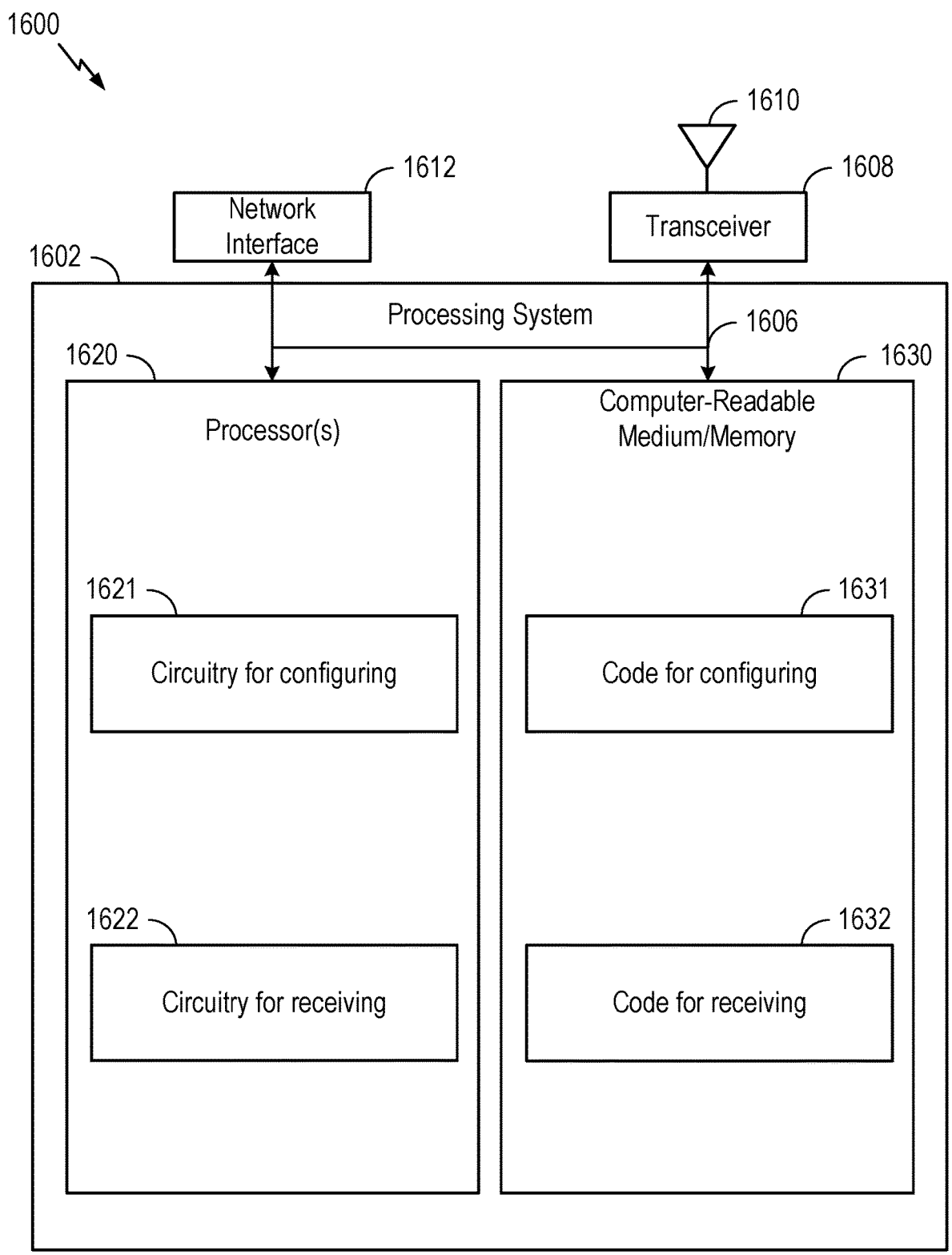
FIG. 16 depicts aspects of an example communications device.

FIG. 16 depicts aspects of an example communications device 1600. In some aspects, communications device 1600 is a network entity, such as BS 102 described above with respect to FIGS. 1 and 3.

The communications device 1600 includes a processing system 1602 coupled to a transceiver 1608 (e.g., a transmitter and/or a receiver) and/or a network interface. The transceiver 1608 is configured to transmit and receive signals for the communications device 1600 via an antenna 1610, such as the various signals as described herein. The network interface 1612 is configured to obtain and send signals for the communications device 1600 via communications link(s), such as a backhaul link, midhaul link, and/or fronthaul link as described herein, such as with respect to FIG. 2. The processing system 1602 may be configured to perform processing functions for the communications device 1600, including processing signals received and/or to be transmitted by the communications device 1600.

The processing system 1602 includes one or more processors 1620. In various aspects, one or more processors 1620 may be representative of one or more of receive processor 338, transmit processor 320, TX MIMO processor 330, and/or controller/processor 340, as described with respect to FIG. 3. The one or more processors 1620 are coupled to a computer-readable medium/memory 1630 via a bus 1606. In certain aspects, the computer-readable medium/memory 1630 is configured to store instructions (e.g., computer-executable code) that when executed by the one or more processors 1620, cause the one or more processors 1620 to perform the operations 1400 described with respect to FIG. 14, or any aspect related to it. Note that reference to a processor of communications device 1600 performing a function may include one or more processors of communications device 1600 performing that function.

In the depicted example, the computer-readable medium/memory 1630 stores code (e.g., executable instructions) for configuring 1631 comprising code for configuring a UE with a beam monitoring configuration indicating at least one condition to be satisfied for transmission of a beam condition report during monitoring of a BFD-RS during ON duration of a DRX cycle, and code for receiving 1632 comprising code for receiving the beam condition report at an end of the ON duration of DRX cycle, when the at least one condition is satisfied during the ON duration of the DRX cycle. Processing of the code 1631-1632 may cause the communications device 1600 to perform the operations 1400 described with respect to FIG. 14, or any aspect related to it.

The one or more processors 1620 include circuitry configured to implement (e.g., execute) the code stored in the computer-readable medium/memory 1630, including circuitry for configuring 1621 comprising circuitry for configuring a UE with a beam monitoring configuration indicating at least one condition to be satisfied for transmission of a beam condition report during monitoring of a BFD-RS during ON duration of a DRX cycle, and circuitry for receiving 1622 comprising circuitry for receiving the beam condition report at an end of the ON duration of DRX cycle, when the at least one condition is satisfied during the ON duration of the DRX cycle.

Processing with circuitry 1621-1622 may cause the communications device 1600 to perform the operations 1400 as described with respect to FIG. 14, or any aspect related to it.

Various components of the communications device 1600 may provide means for performing the operations 1400 as described with respect to FIG. 14, or any aspect related to it. Means for transmitting, sending or outputting for transmission may include the transceivers 332 and/or antenna(s) 334 of the BS 102 illustrated in FIG. 3 and/or transceiver 1608 and antenna 1610 of the communications device 1600 in FIG. 16. Means for receiving or obtaining may include the transceivers 332 and/or antenna(s) 334 of the BS 102 illustrated in FIG. 3 and/or transceiver 1608 and antenna 1610 of the communications device 1600 in FIG. 16.

Example Clauses

Implementation examples are described in the following numbered clauses:

Clause 1: A method for wireless communications by a user equipment (UE), comprising: receiving a beam monitoring configuration indicating at least one condition to be satisfied for transmission of a beam condition report; monitoring at least one beam failure detection (BFD)-reference signal (RS) during an ON duration of a discontinuous reception (DRX) cycle; and transmitting the beam condition report at an end of the ON duration of the DRX cycle, when the at least one condition is satisfied during the ON duration of the DRX cycle.

Clause 2: The method alone or in combination with the first clause, wherein the at least one condition is satisfied when a value of a signal to interference noise ratio (SINR) of the at least one BFD-RS is dropped by a predetermined value compared to a previous SINR value during the ON duration of the DRX cycle.

Clause 3: The method alone or in combination with the first clause, wherein: the beam monitoring configuration further indicates a beam monitoring set; the beam monitoring set indicates a set of different beams; and the at least one condition is satisfied when the UE determines a new beam not included in the beam monitoring set during the ON duration of the DRX cycle.

Clause 4: The method alone or in combination with the first clause, wherein the at least one condition is satisfied when the UE predicts a beam failure, based on one or more signal measurements associated with the at least one BFD-RS, during the ON duration of the DRX cycle.

Clause 5: The method alone or in combination with the first clause, wherein: the beam condition report indicates information identifying one or more factors for the transmission of the beam condition report, and the information indicates at least one of: a predicted beam failure based on one or more signal measurements associated with the at least one BFD-RS or a drop in a channel strength beyond a threshold within a predetermined period of time.

Clause 6: The method alone or in combination with the first clause, wherein: the beam condition report indicates a status of a BFD based on determining indications of a beam failure instance (BFI) at each occasion of the at least one BFD-RS during the monitoring of the at least one BFD-RS in the ON duration of the DRX cycle, and the status indicates at least one of: a current number of total BFI counts or a BFI record history.

Clause 7: The method alone or in combination with the first clause, wherein: the beam condition report indicates a channel measurement report associated with a channel between the UE and a network entity, and the channel measurement report indicates at least one of: a signal to interference noise ratio (SINR), a signal to noise ratio (SNR), a reference signal receive power (RSRP), or a pathloss.

Clause 8: The method alone or in combination with the first clause, wherein: the beam condition report indicates a preferred response from a network entity, and the preferred response indicates at least one of: a first request to switch from one beam to another beam, a second request for additional BFD-RS resources to monitor new beams for a BFD, or a third request to change a subset of beams within a beam monitoring set indicating a set of different beams.

Clause 9: The method alone or in combination with the first clause, wherein the transmitting further comprises transmitting the beam condition report using different techniques selected based on a size of the beam condition report.

Clause 10: The method alone or in combination with the ninth clause, wherein the transmitting further comprises transmitting the beam condition report using: an uplink control information (UCI) when the size of the beam condition report is less than a predetermined size or a medium access control (MAC) control element (CE) when the size of the beam condition report is more than the predetermined size.

Clause 11: The method alone or in combination with the first clause, further comprising monitoring a response to the beam condition report from a network entity, after a first predetermined period of time, for a second predetermined period of time.

Clause 12: The method alone or in combination with the eleventh clause, further comprising initiating retransmission of the beam condition report, when no response is received during the second predetermined period of time.

Clause 13: The method alone or in combination with the twelfth clause, wherein: the initiating comprises initiating retransmission of the beam condition report to a maximum of predetermined number of times, and each retransmission of the beam condition report is separated by a third predetermined period of time.

Clause 14: The method alone or in combination with the twelfth clause, wherein: the initiating comprises initiating retransmission of the beam condition report to a maximum of predetermined number of times, and each retransmission of the beam condition report is separated by a different period of time.

Clause 15: A method for wireless communications by a network entity, comprising: configuring a user equipment (UE) with a beam monitoring configuration indicating at least one condition to be satisfied for transmission of a beam condition report during monitoring of a beam failure detection (BFD)-reference signal (RS) during an ON duration of a discontinuous reception (DRX) cycle; and receiving the beam condition report at an end of the ON duration of DRX cycle, when the at least one condition is satisfied during the ON duration of the DRX cycle.

Clause 16: The method alone or in combination with the fifteenth clause, further comprising configuring the UE with a new beam monitoring configuration indicating at least one new condition to be satisfied for the transmission of the beam condition report.

Clause 17: The method alone or in combination with the fifteenth clause, further comprising configuring the UE with a beam condition report configuration indicating one or more types of the beam condition report.

Clause 18: The method alone or in combination with the seventeenth clause, further comprising configuring the UE with a new beam condition report configuration indicating one or more new types of the beam condition report.

Clause 19: The method alone or in combination with the fifteenth clause, further comprising configuring the UE with different transmitting options to transmit the beam condition report.

Clause 20: The method alone or in combination with the nineteenth clause, wherein the different transmitting options are associated with different sizes of the beam condition report.

Clause 21: The method alone or in combination with the fifteenth clause, further comprising configuring the UE with a beam condition report retransmission configuration indicating a retransmission procedure of the beam condition report.

Clause 22: The method alone or in combination with the twenty-first clause, wherein the retransmission procedure of the beam condition report is based on at least one of: a quality of service (QoS) requirement of a serving traffic, a delay estimate, or a pathloss estimate.

Clause 23: An apparatus, comprising: a memory comprising executable instructions; and a processor configured to execute the executable instructions and cause the apparatus to perform a method in accordance with any one of Clauses 1-22.

Clause 24: An apparatus, comprising means for performing a method in accordance with any one of Clauses 1-22.

Clause 25: A non-transitory computer-readable medium comprising executable instructions that, when executed by a processor of an apparatus, cause the apparatus to perform a method in accordance with any one of Clauses 1-22.

Clause 26: A computer program product embodied on a computer-readable storage medium comprising code for performing a method in accordance with any one of Clauses 1-22.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A user equipment (UE) configured for wireless communications, comprising:
   a memory comprising instructions; and
   one or more processors configured, individually or in any combination, to execute the instructions and cause the UE to:
   receive a beam monitoring configuration indicating at least one condition to be satisfied for transmission of a beam condition report;
   monitor at least one beam failure detection (BFD)-reference signal (RS) during an ON duration of a discontinuous reception (DRX) cycle; and
   transmit the beam condition report corresponding to the at least one BFD-RS at an end of the ON duration of the DRX cycle, when the at least one condition is satisfied and the UE is unable to confirm a beam failure of the at least one BFD-RS at the end of the ON duration of the DRX cycle, wherein the beam condition report indicates a potential beam failure of the at least one BFD-RS and a request for BFD-RS resources to monitor one or more new BFD-RSs for a BFD, and wherein the at least one condition is satisfied based on at least one of:
   when a value of a signal to interference noise ratio (SINR) of the at least one BFD-RS is dropped by a predetermined value compared to a previous SINR value during the ON duration of the DRX cycle;
   when the UE determines a new beam is not included in a beam monitoring set during the ON duration of the DRX cycle, the beam monitoring configuration further indicates the beam monitoring set and the beam monitoring set indicates a set of different beams; or
   when the UE predicts the beam failure, based on one or more signal measurements associated with the at least one BFD-RS, during the ON duration of the DRX cycle.

2. The UE of claim 1, wherein:
   the beam condition report indicates information identifying one or more factors for the transmission of the beam condition report, and
   the information indicates at least one of: a predicted beam failure based on the one or more signal measurements associated with the at least one BFD-RS or a drop in a channel strength beyond a threshold within a predetermined period of time.

3. The UE of claim 1, wherein:
   the beam condition report indicates a status of a BFD based on determining indications of a beam failure instance (BFI) at each occasion of the at least one BFD-RS during the monitoring of the at least one BFD-RS in the ON duration of the DRX cycle, and
   the status indicates at least one of: a current number of total BFI counts or a BFI record history.

4. The UE of claim 1, wherein:
   the beam condition report indicates a channel measurement report associated with a channel between the UE and a network entity, and
   the channel measurement report indicates at least one of: an SINR a signal to interference noise ratio (SINR), a signal to noise ratio (SNR), a reference signal receive power (RSRP), or a pathloss.

5. The UE of claim 1, wherein:
   the beam condition report indicates a preferred response from a network entity, and
   the preferred response indicates at least one of: a first request to switch from one beam to another beam or a second request to change a subset of beams within a beam monitoring set indicating a set of different beams.

6. The UE of claim 1, wherein the transmit further comprises transmit the beam condition report using different techniques selected based on a size of the beam condition report.

7. The UE of claim 6, wherein the transmit further comprises transmit the beam condition report using: an uplink control information (UCI) when the size of the beam condition report is less than a predetermined size or a medium access control (MAC) control element (CE) when the size of the beam condition report is more than the predetermined size.

8. The UE of claim 1, wherein the one or more processors are further configured, individually or in any combination, to execute the instructions and cause the UE to: monitor a response to the beam condition report from a network entity, after a first predetermined period of time, for a second predetermined period of time.

9. The UE of claim 8, wherein the one or more processors are further configured, individually or in any combination, to execute the instructions and cause the UE to: initiate retransmission of the beam condition report, when no response is received during the second predetermined period of time.

10. The UE of claim 9, wherein:
the initiate comprises initiate the retransmission of the beam condition report to a maximum of predetermined number of times, and
each retransmission of the beam condition report is separated by a third predetermined period of time.

11. The UE of claim 9, wherein:
the initiate comprises initiate the retransmission of the beam condition report to a maximum of predetermined number of times, and each retransmission of the beam condition report is separated by a different period of time.

12. A network entity configured for wireless communications, comprising:
a memory comprising instructions; and
one or more processors configured, individually or in any combination, to execute the instructions and cause the network entity to:
configure a user equipment (UE) with a beam monitoring configuration indicating at least one condition to be satisfied for transmission of a beam condition report during monitoring of a beam failure detection (BFD)-reference signal (RS) during an ON duration of a discontinuous reception (DRX) cycle; and
receive the beam condition report corresponding to the at least one BFD-RS at an end of the ON duration of DRX cycle, when the at least one condition is satisfied and the UE is unable to confirm a beam failure of the at least one BFD-RS at the end of the ON duration of the DRX cycle, wherein the beam condition report indicates a potential beam failure of the at least one BFD-RS and a request for BFD-RS resources to monitor one or more new BFD-RSs for a BFD, and wherein the at least one condition is satisfied based on at least one of:
when a value of a signal to interference noise ratio (SINR) of the at least one BFD-RS is dropped by a predetermined value compared to a previous SINR value during the ON duration of the DRX cycle;
when a new beam is not included in a beam monitoring set during the ON duration of the DRX cycle, the beam monitoring configuration further indicates the beam monitoring set and the beam monitoring set indicates a set of different beams; or
when the beam failure is predicted, based on one or more signal measurements associated with the at least one BFD-RS, during the ON duration of the DRX cycle.

13. The network entity of claim 12, wherein the one or more processors are further configured, individually or in any combination, to execute the instructions and cause the network entity to: configure the UE with a new beam monitoring configuration indicating at least one new condition to be satisfied for the transmission of the beam condition report.

14. The network entity of claim 12, wherein the one or more processors are further configured, individually or in any combination, to execute the instructions and cause the network entity to: configure the UE with a beam condition report configuration indicating one or more types of the beam condition report.

15. The network entity of claim 14, wherein the one or more processors are further configured, individually or in any combination, to execute the instructions and cause the network entity to: configure the UE with a new beam condition report configuration indicating one or more new types of the beam condition report.

16. The network entity of claim 14, wherein the one or more processors are further configured, individually or in any combination, to execute the instructions and cause the network entity to: configure the UE with different transmitting options to transmit the beam condition report.

17. The network entity of claim 16, wherein the different transmitting options are associated with different sizes of the beam condition report.

18. The network entity of claim 12, wherein the one or more processors are further configured, individually or in any combination, to execute the instructions and cause the network entity to: configure the UE with a beam condition report retransmission configuration indicating a retransmission procedure of the beam condition report.

19. The network entity of claim 18, wherein the retransmission procedure of the beam condition report is based on at least one of: a quality of service (QOS) requirement of a serving traffic, a delay estimate, or a pathloss estimate.

20. A method for wireless communications by a user equipment (UE), comprising:
receiving a beam monitoring configuration indicating at least one condition to be satisfied for transmission of a beam condition report;
monitoring at least one beam failure detection (BFD)-reference signal (RS) during an ON duration of a discontinuous reception (DRX) cycle; and
transmitting the beam condition report corresponding to the at least one BFD-RS at an end of the ON duration of the DRX cycle, when the at least one condition is satisfied and the UE is unable to confirm a beam failure of the at least one BFD-RS at the end of the ON duration of the DRX cycle, wherein the beam condition report indicates a potential beam failure of the at least one BFD-RS and a request for BFD-RS resources to monitor one or more new BFD-RSs for a BFD, and wherein the at least one condition is satisfied based on at least one of:
when a value of a signal to interference noise ratio (SINR) of the at least one BFD-RS is dropped by a predetermined value compared to a previous SINR value during the ON duration of the DRX cycle;
when the UE determines a new beam is not included in a beam monitoring set during the ON duration of the DRX cycle, the beam monitoring configuration further indicates the beam monitoring set and the beam monitoring set indicates a set of different beams; or
when the UE predicts the beam failure, based on one or more signal measurements associated with the at least one BFD-RS, during the ON duration of the DRX cycle.

21. A method for wireless communications by a network entity, comprising:
configuring a user equipment (UE) with a beam monitoring configuration indicating at least one condition to be satisfied for transmission of a beam condition report during monitoring of a beam failure detection (BFD)-reference signal (RS) during an ON duration of a discontinuous reception (DRX) cycle; and
receiving the beam condition report corresponding to the at least one BFD-RS at an end of the ON duration of the DRX cycle, when the at least one condition is satisfied and the UE is unable to confirm a beam failure of the at least one BFD-RS at the end of the ON duration of the DRX cycle, wherein the beam condition report indicates a potential beam failure of the at least one BFD-RS and a request for BFD-RS resources to monitor one or more new BFD-RSs for a BFD, and wherein the at least one condition is satisfied based on at least one of:

when a value of a signal to interference noise ratio (SINR) of the at least one BFD-RS is dropped by a predetermined value compared to a previous SINR value during the ON duration of the DRX cycle;

when a new beam is not included in a beam monitoring set during the ON duration of the DRX cycle, the beam monitoring configuration further indicates the beam monitoring set and the beam monitoring set indicates a set of different beams; or when the beam failure is predicted, based on one or more signal measurements associated with the at least one BFD-RS, during the ON duration of the DRX cycle.

22. The method of claim 21, further comprising configuring the UE with a new beam monitoring configuration indicating at least one new condition to be satisfied for the transmission of the beam condition report.

23. The method of claim 22, further comprising configuring the UE with a beam condition report configuration indicating one or more types of the beam condition report.

24. The method of claim 21, further comprising configuring the UE with different transmitting options to transmit the beam condition report.

* * * * *